United States Patent [19]

Garnweidner et al.

[11] Patent Number: 5,046,777
[45] Date of Patent: Sep. 10, 1991

[54] IMPACT GIRDER IN AN AUTOMOBILE WALL ASSEMBLY WITH INTENTIONAL BUCKLING OF EDGE PORTIONS

[75] Inventors: Peter Garnweidner, Lamprechtshausen; Peter Üblacker, Bürmoos, both of Austria

[73] Assignee: Austria Metall Aktiengesellschaft, Braunau, Austria

[21] Appl. No.: 521,722

[22] Filed: Apr. 23, 1990

[51] Int. Cl.$^5$ .............................................. E04B 1/18
[52] U.S. Cl. ..................................... 296/189; 52/731; 52/98
[58] Field of Search ................... 52/98, 720, 731, 738, 52/DIG. 15; 296/188, 189

[56] References Cited

U.S. PATENT DOCUMENTS

| | | | |
|---|---|---|---|
| 742,549 | 8/1903 | Forsyth et al. | 52/731 |
| 799,320 | 2/1904 | Franks | 52/731 |
| 3,224,154 | 12/1965 | Toti et al. | 52/731 |
| 4,702,515 | 10/1987 | Kato et al. | 296/189 |

FOREIGN PATENT DOCUMENTS 0235091  2/1987  European Pat. Off. .
0284566  3/1988  European Pat. Off. .

Primary Examiner—Richard E. Chilcot, Jr.
Assistant Examiner—Robert J. Canfield
Attorney, Agent, or Firm—Herbert Dubno; Ronald Lianides

[57] ABSTRACT

An impact girder for a door or side wall of a motor vehicle body has a longitudinally extending hollow space. Along outer edge portions the compression flange overhangs the lateral webs and this overhanging portion is raised relative to the recessed portions between the lateral webs so that, upon impact, the edge portions buckle outwardly and tear away from the remainder of the compression flange which buckles inwardly.

8 Claims, 3 Drawing Sheets

IMPACT GIRDER IN AN AUTOMOBILE WALL ASSEMBLY WITH INTENTIONAL BUCKLING OF EDGE PORTIONS

FIELD OF THE INVENTION

The present invention relates to an impact girder which can be incorporated into a side wall and/or a door of an automotive vehicle, especially a passenger vehicle, so as to be interposed between the outer sheet metal wall and the passenger compartment to protect the occupants against a lateral collision.

BACKGROUND OF THE INVENTION

It is known to provide the door, the door frame or other parts of the side wall of an automotive vehicle with one or more impact girders designed, by controlled deformation, to take up at least a portion of the energy of an impact applied to a side of the vehicle, e.g. a lateral collision.

Reference may be had in that regard to the commonly owned U.S. Pat. No. 4,915,442 issued Apr. 10, 1990. The girder profiles or structural shapes which have been used heretofore for this purpose, have been tube structures, I-beam profiles, II-beam profiles or other hollow structural shapes. The girder can be composed of metal and can be located along the side of the vehicle, generally at a level of a bumper of a vehicle which might be expected to impact on the side of the vehicle provided with the impact girder. The impact girder can be mounted at its ends on the vehicle body, for example, on parts of the door frame when the impact girder is to be provided in the door of the vehicle. In the case of impact girders which are located in a side wall region other than a door, the impact girder can be affixed at its ends to the struts, braces or other parts of the vehicle body itself.

To maximize the deformation work and thus attenuate the impact to the greatest possible degree and thereby protect the occupants of the vehicle against the lateral impact, the deformation resistance of the impact girder should be only slightly smaller than that of the frame or door construction in which the impact girder is incorporated.

During a collision process, however, before complete deformation of the structure, the resistance to deformation of the impact girder should not be so high that the supporting beams or frame parts will be deformed or the impact girder torn from the body of the vehicle.

The customary impact girders show an increased resistance to deformation during the deformation process. As a consequence, the resistance to deformation cannot at the start of such deformation be only slightly smaller than the deformation resistance of the supporting beams and frame parts. Hence the initial resistance to deformation of the impact girder may be substantially smaller than is desirable. It is also desirable to provide an impact girder whose resistance force or resistance to deformation is approximately constant over the total deformation stroke of the impact girder.

OBJECTS OF THE INVENTION

It is, therefore, the principal object of the present invention to provide an impact girder which is free from the disadvantages of earlier structural elements of this type and which also provides a substantially constant resistance force or resistance to deformation under impact over the entire deformation of the girder.

A more specific object of the invention is to provide an impact girder which can have an initial resistance to deformation only slightly less than the parts supporting same and which thereafter will have a resistance to deformation which is largely constant.

SUMMARY OF THE INVENTION

These objects and others which will become apparent hereinafter are attained, in accordance with the invention by forming the compression flange so that it laterally projects beyond the respective outer webs and these projecting portions of the compression flange are raised by comparison to the intervening portion between the webs which can be considered a recessed portion. The raised and recessed configuration is found at least along the outer surface of the compression flange. Because of the raised configuration of the projecting parts of the compression flange, the forces which are applied during collision act upon these parts. The result is a moment or torque around the intersection of the compression flange and an outer or lateral web which causes a twist of the projecting part in the direction of force application.

The central portion of the compression flange is bent outwardly and the angle between the inner surface of the web and the compression flange is increased.

A tearing force at the internal corner formed by each junction between the lateral web and the compression flange rips the raised projecting portion away from the recessed portion and the lateral web and buckles the torn away strip outwardly. This has the effect of sharply reducing the resistance of the impact girder to the impact so that the further deformation at the impact region is effected without the detrimental increase in the resistance of prior art impact girders and, at the impact location, the impact girder can be sharply deformed.

The force applied from the exterior which causes this separation of the raised regions along a longitudinal crack initiated along the corners, drives the compression flange at this region into the girder. The entire girder can then buckle inwardly toward the interior of the vehicle in a controlled, impact-attenuating manner.

The angle between the inner surface of a lateral web and the compression flange has a notch effect ensuring an intentional tearing during the impact to form the crack at this location as soon as the strength of the impact girder is exceeded by the applied impact force.

It has been found to be advantageous to make the wall thickness of the raised parts greater than the wall thickness of the remainder of the compression flange. This increases the buckling which has been described. The raised regions have a greater stiffness than the central regions of the compression flange between the lateral webs to minimize the deformation of the thicker members as they separate from the balance of the impact girder and ensures an inward buckling of the compression flange in the recessed or thinner region between the separated strips constituted by the edge portions.

It has been found to be advantageous, moreover, to form the corner between each lateral web and the compression flange as a sharp edged corner to concentrate the crack formation at this corner and maintain the crack formation so that it extends longitudinally along the corner as the deformation continues.

It has been found to be advantageous, moreover, to provide the recessed portion as an inwardly projecting ledge beginning at the aforementioned corners. This allows a sharp acute angle to be formed by the cross section at each of the compression flange/lateral web corners and augments the notch effect.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 6:
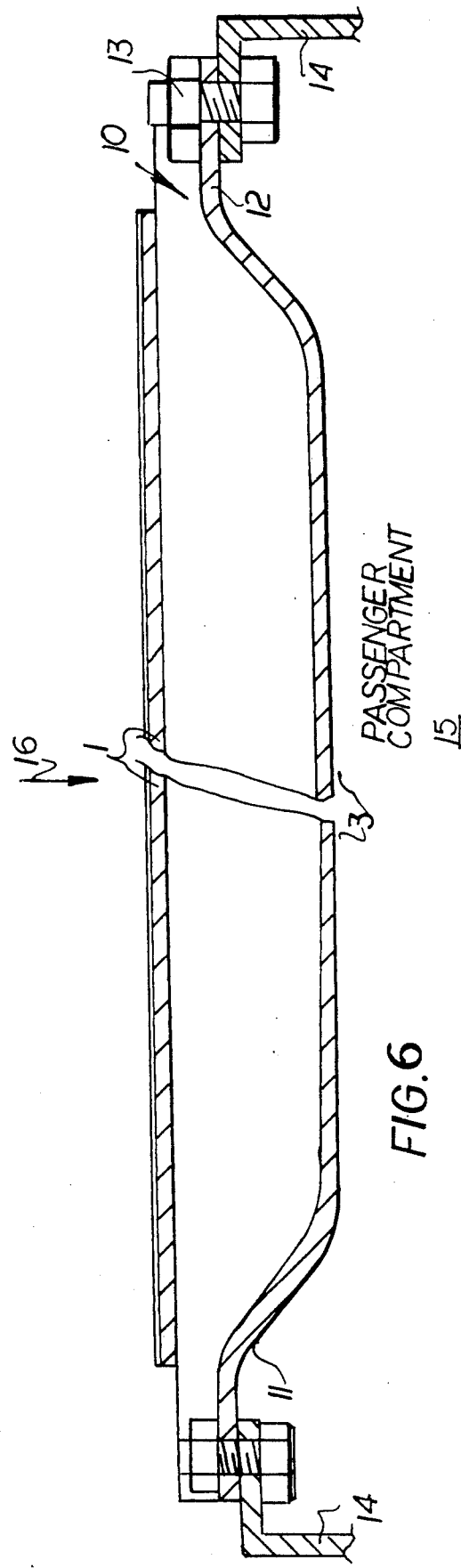
FIG. 6 is a longitudinal section of the impact girder showing the mounting on door frame members.

Referring first to FIG. 6, it can be seen that a beam 10 adapted to form an impact girder, according to the invention, can have ends 11 and 12 connected by bolts 13 to the frame members 14 of the vehicle door so that the girder is interposed between the outside of the vehicle, where it can be covered by the sheet metal covering of the door (not shown) and the passenger compartment which has been labelled 15 but is not otherwise illustrated. The impact girder can receive an impact in the direction of the arrow 16.

Figure 1:
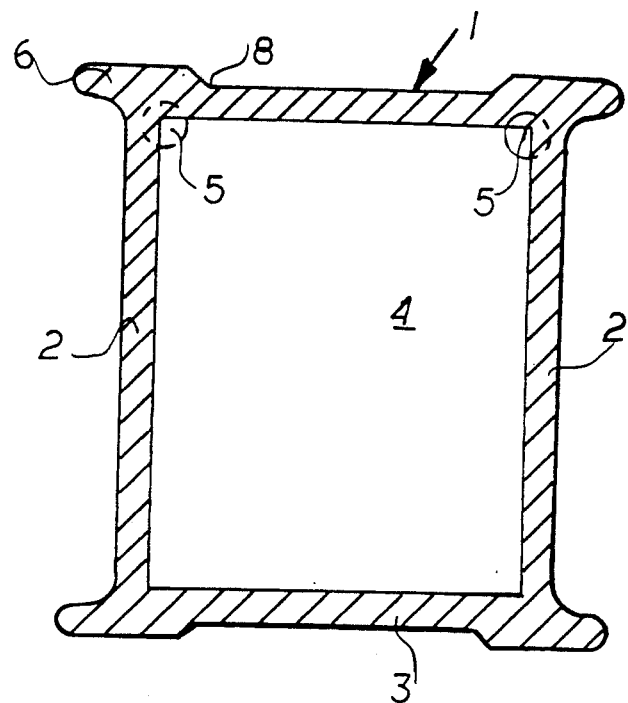
FIG 1 is a transverse cross section through an impact girder according to the invention.

Turning now to FIG. 1, which could be considered a cross section of the impact girder of FIG. 6 but drawn to a larger scale, it will be seen that the beam 10 comprises a compression flange 1, the outer or lateral webs 2 and the tension flange 3. Members 1–3 define a hollow space 4 extending longitudinally of the metal beam.

Within the hollow space 4, sharp edged corners 5 are provided between the compression flange 1 and each lateral or outer web 2. The sharp edged corner 5 is seen as a right-angle corner in FIG. 1.

Figure 2:
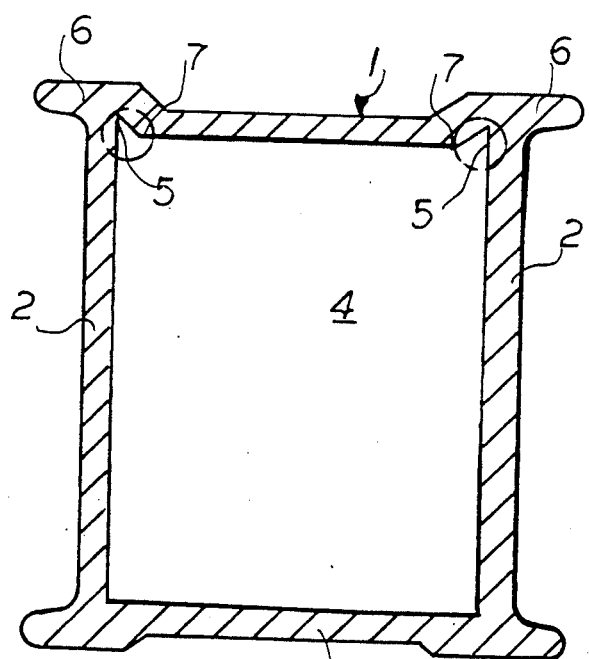
FIG. 2 is a cross section through an impact girder of a second embodiment.

FIG. 2 shows an alternative configuration of this corner. At the vertex of this corner, a ledge 7 begins and projects inwardly, because of this inward projection, the resulting corner can have the cross section of a sharp acute angle.

At the edge portion 6, the compression flange 1 projects laterally outwardly beyond the outer faces of the lateral webs 2. In addition, the portion 6 is raised by comparison with the recessed portion 8 between the side walls 2. In practice, the raised portion 6 can be formed by regions of the compression flange 1 which have a greater thickness than that of the intermediate or recessed portion 8 thereof.

Figure 3:
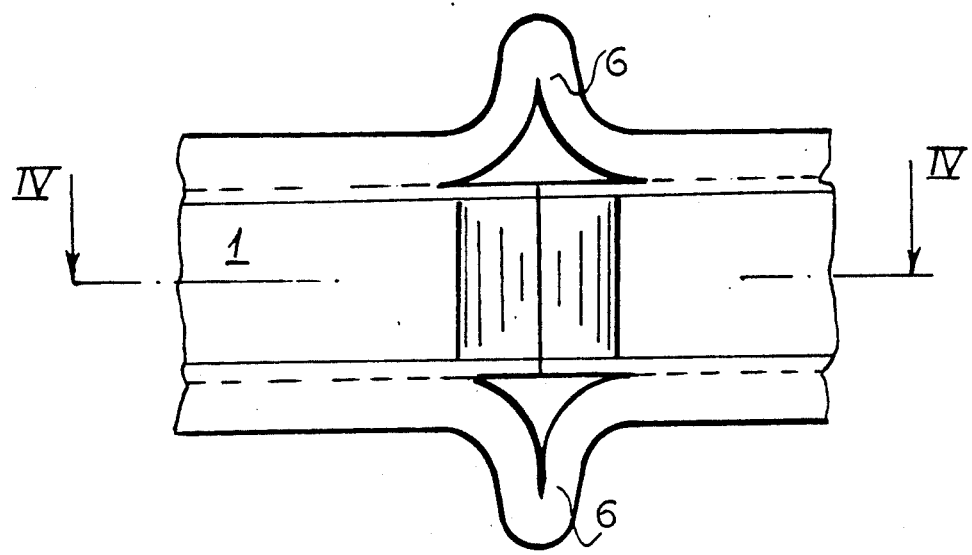
FIG. 3 is a fragmentary elevational view, seen in the direction of impact, of a girder which has been subjected to deformation.
Figure 4:
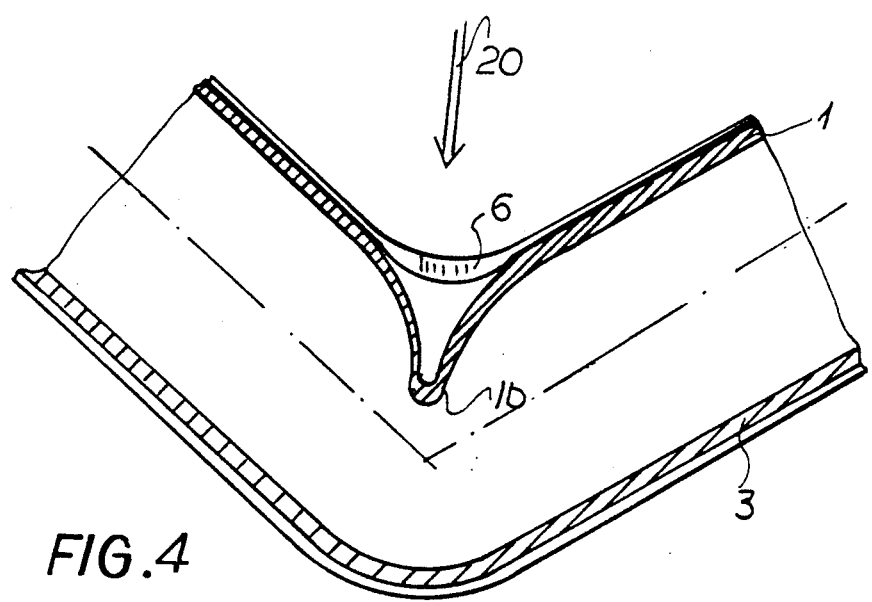
FIG. 4 is a section along the line IV—IV of FIG. 3.
Figure 5:
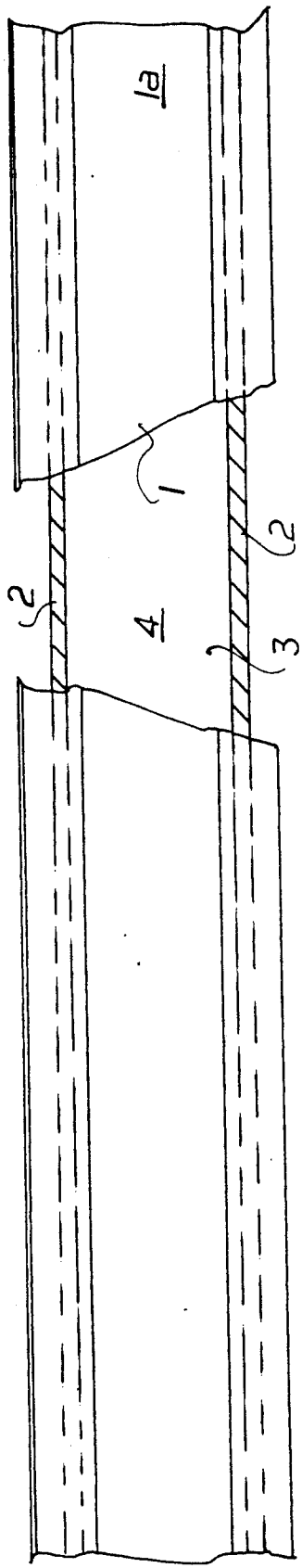
FIG. 5 is a view similar to FIG. 3 but prior to the impact.

The sharp edged corners 5, especially when they are of acute-angle cross section as in the embodiment of FIG. 2, provide an intentional tear line at each of these corners. Thus, when a force of an impact is applied at 20, e.g. as a result of a lateral collision, the edge portion 6 tear away from the web and the compression flange locally as shown in FIG. 3 and buckle outwardly. The tear is initiated at the corners 5. The portion of the compression flange lying between the torn away edge portions buckles sharply inwardly as shown at 16 in FIG. 4.

We claim:

1. An automobile wall assembly for an automobile having a passenger compartment, said assembly comprising a vehicle body frame, an outer sheet metal covering, and an impact girder secured at its ends to said frame inwardly of said covering and between said covering and said compartment, said impact girder comprising:

an impact girder for a motor vehicle which comprises a one-piece elongated beam integrally formed with a longitudinally extending hollow space, a compression flange, a tension flange spaced from and generally parallel to said compression flange and lateral webs connecting said flanges and general perpendicular thereto, said compression flange projecting laterally beyond the respective lateral webs to form opposite edge portions of said compression flange unitary therewith and overhanging said webs, said edge portions being raised between a respective lateral web and an outer boundary of the compression flange relative to a recessed portion of said compression flange between said lateral webs, said lateral webs unitarily adjoining said compression flange along said hollow space in a sharp corner imparting a notch separation effect upon buckling of the girder.

2. The automobile wall assembly defined in claim 1 wherein said edge portions are of greater thickness than said recessed portion.

3. The automobile wall assembly defined in claim 2 wherein said recessed portion forms a respective ledge beginning at each lateral-web/compression-flange corner and projecting into said hollow space.

4. The automobile wall assembly defined in claim 1 wherein said recessed portion forms a ledge beginning at each lateral-web/compression-flange corner and projecting into said hollow space.

5. An impact girder for a motor vehicle which comprises a one-piece elongated beam integrally formed with a longitudinally extending hollow space, a compression flange, a tension flange spaced from and generally parallel to said compression flange and lateral webs connecting said flanges and generally perpendicular thereto, said compression flange projecting laterally beyond the respective lateral webs to form opposite edge portions of said compression flange unitary therewith and overhanging said webs, said edge portions being raised between a respective lateral web and an outer boundary of the compression flange relative to a recessed portion of said compression flange between said lateral webs, said lateral webs unitarily adjoining said compression flange along said hollow space in a sharp corner imparting a notch separation effect upon buckling of the girder.

6. The impact girder defined in claim 5 wherein said edge portions are of greater thickness than said recessed portion.

7. The impact girder defined in claim 6 wherein said recessed portion forms a respective ledge beginning at each lateral-web/compression-flange corner and projecting into said hollow space.

8. The impact girder defined in claim 5 wherein said recessed portion forms a ledge beginning at each lateral-web/compression-flange corner and projecting into said hollow space.

* * * * *